United States Patent
Da Silva Lopes et al.

(10) Patent No.: US 11,117,913 B2
(45) Date of Patent: Sep. 14, 2021

(54) TRIDENTATE IMINOPYRROLYL NICKEL COMPLEXES AND THEIR USE AS CATALYSTS FOR THE REACTION OF POLYMERISATION OF ETHYLENE TO HYPERBRANCHED POLYETHYLENE

(71) Applicant: INSTITUTO SUPERIOR TÉCNICO, Lisbon (PT)

(72) Inventors: Patrícia Da Silva Lopes, Almada (PT); Cláudia Alexandra Carica Figueira, Almada (PT); Pedro Manuel Machado Teixeira Gomes, Lisbon (PT)

(73) Assignee: INSTITUTO SUPERIOR TÉCNICO, Lisbon (PT)

( * ) Notice: Subject to any disclaimer, the term of this patent is extended or adjusted under 35 U.S.C. 154(b) by 0 days.

(21) Appl. No.: 16/624,495

(22) PCT Filed: Jun. 20, 2018

(86) PCT No.: PCT/PT2018/000013
§ 371 (c)(1),
(2) Date: Dec. 19, 2019

(87) PCT Pub. No.: WO2018/236237
PCT Pub. Date: Dec. 27, 2018

(65) Prior Publication Data
US 2020/0165282 A1 May 28, 2020

(30) Foreign Application Priority Data
Jun. 21, 2017 (PT) .......................................... 110157

(51) Int. Cl.
C07F 15/04 (2006.01)
C08F 4/70 (2006.01)
(Continued)

(52) U.S. Cl.
CPC ............ *C07F 15/04* (2013.01); *C08F 110/02* (2013.01); *C08G 83/005* (2013.01); *C08F 4/70* (2013.01);
(Continued)

(58) Field of Classification Search
CPC ........ C08F 4/70; C08F 4/7039; C08F 4/7067; C07F 15/04
See application file for complete search history.

(56) References Cited

U.S. PATENT DOCUMENTS 6,182,305 B1 * 2/2001 O'Connell ............. A47B 77/02
269/289 R
6,812,306 B2 * 11/2004 Kristen ................. C07F 15/006
502/155
(Continued)

FOREIGN PATENT DOCUMENTS

WO 9842665 10/1998
WO 0210133 2/2002
WO WO 2013.039413 A1 * 3/2013 ............... C07F 5/02

OTHER PUBLICATIONS

R. M. Bellabarba; P. T. Gomes; S. I. Pascu, Dalton Trans.,"Synthesis of allyl- and aryl-iminopyrrolyl complexes of nickel" (20030000), vol. 4431 DOI: 10.1039/C8DT02824A.

*Primary Examiner* — Rip A Lee
(74) *Attorney, Agent, or Firm* — Duane Morris LLP; Gregory M. Lefkowitz; Brandon A. Chan (57) ABSTRACT

The present invention relates to the preparation of novel nickel complexes containing iminopyrrolyl-type ligands, having the general molecular structure (I), and to their use as active catalysts in the polymerisation reaction of ethylene to hyperbranched polyethylene. The structure of the ligand precursor is such that it allows the occurrence of a cyclo-
(Continued)

(I)

metallation reaction by the activation of a C—H bond, in the coordination reaction to the metal centre, generating a C,N,N'-tridentate complex.

20 Claims, 5 Drawing Sheets

(51) Int. Cl.
    *C08F 110/02* (2006.01)
    *C08G 83/00* (2006.01)

(52) U.S. Cl.
    CPC .......... *C08F 4/7039* (2013.01); *C08F 4/7067* (2013.01); *C08F 4/7068* (2013.01)

(56) References Cited

U.S. PATENT DOCUMENTS

| | | |
|---|---|---|
| 9,034,761 B2 * | 5/2015 | Lansalot-Matras .......................... H01L 21/28506 438/681 |
| 9,416,205 B2 * | 8/2016 | Qin ........................ C07F 5/003 |
| 2005/0209420 A1 | 9/2005 | Solan et al. |

* cited by examiner (I)

Figure 1

(a) (II)  (b) (III)

TRIDENTATE IMINOPYRROLYL NICKEL COMPLEXES AND THEIR USE AS CATALYSTS FOR THE REACTION OF POLYMERISATION OF ETHYLENE TO HYPERBRANCHED POLYETHYLENE

CROSS-REFERENCE TO RELATED APPLICATIONS

This application is a § 371 national stage entry of International Application No. PCT/PT2018/000013, filed Jun. 20, 2018, which claims priority of Portuguese National Application No. 110157 filed Jun. 21, 2017, the entire contents of which are incorporated herein by reference.

FIELD OF THE INVENTION

Technical Field of the Invention

The present invention relates to the synthesis of new organometallic nickel compounds containing iminopyrrolyl-type tridentate ligands, being included within the areas of Organic Chemistry and Organometallic Chemistry. The present invention also relates to the use of these compounds as aluminium-free catalysts for the reaction of oligomerisation or polymerisation of ethylene to hyperbranched polyethylene, being also included in the areas of Homogeneous Catalysis and Oligomerisation or Polymerisation of Olefins.

State of the Art

The study of the reactions of homo- and copolymerisation of ethylene and $\alpha$-olefins has been a subject of current interest in the scientific and industrial communities, either in the search for more efficient new catalytic systems or new materials, and also more sustainable reaction media. In particular, important advances have been made in the development of new homogeneous catalysts with late transition metals that are active in the absence of aluminium co-catalysts. R. Grubbs and co-workers (1998-2003) started a pioneering work in this field by synthesising alkyl- or -arylnickel complexes with mononegative phenoxyimine ligands, which were tested as catalytic precursors for the homo- and copolymerisation of ethylene with polar monomers, in the absence of aluminium co-catalysts, showing high activities under mild reaction conditions. Other authors, such as M. Brookhart (2003), Y.-S. Li (2005-2012) or S. Mecking (2004-2009) extended this research area by developing similar nickel based catalysts. However, up to now, reports about the study of nickel complexes containing iminopyrrolyl-type ligands, which can be related to the previous systems, are scarce. This fact led to the development of neutral nickel complexes bearing bidentate ligands 2-iminopyrrolyl derivatives, which showed to be active as catalysts in the oligomerisation of ethylene (R. M. Bellabarba, P. T. Gomes, S. I. Pascu, *Dalton Trans.* 2003, 4431).

Taking into account that the bulkiness of the chelating ligand influences the activity of the catalytic systems towards the oligo-/polymerisation, as well as the molecular weight of the oligomers/polymers obtained, a new family of nickel(II) complexes bearing bulky bidentate ligands of the type 5-aryl-2-(N-aryl)formiminopyrrolyl was developed, with stereochemical and/or electronic modifications introduced by using different aryl substituents (C. A. Figueira, 2013). This study led also to the formation of C,N,N'-tridentate nickel(II) complexes through an intramolecular C—H activation.

In the literature there are some reported examples involving intramolecular C—H bond activation reactions leading to the formation of C,N,N'-tridentate (or similar) late transition metal complexes. Generally, the structure of the ligand has a particular C—H bond in an ortho carbon of a phenyl or aryl ring that is forced to approach the metal centre, which promotes the activation and the formation of the cyclometallated product. The reported examples encompass N,X iridium complexes (where X=N', O, S), N,O osmium complexes and N,N' platinum and palladium complexes. This unexpected type of reactions was also described for nickel by a restricted number of authors. G. Bazan and co-workers (2001) reported the first example while studying the effect of the substitution of the pyridine ligand in pyridinecarboxamidato nickel complexes. In the particular case of the N-(2,6-$^i$Pr$_2$C$_6$H$_3$)-6-(Si$^i$Pr$_3$)-2-pyridinecarboxamide ligand, one of the isopropyl groups bonded to the Si atom underwent C—H activation after coordination. M. Chetcuti and co-workers (2010) studied Cp and Cp* nickel complexes bearing N-heterocyclic carbene (NHC) ligands and described a C—H activation of the acetonitrile ligand, giving rise to a cyanomethyl nickel complex. Subsequently, they also reported a series of complexes of the type [Ni(NHC)CpX] (where X=Cl, Br, I), in which one of the nitrogen atoms of the carbene ring contains an alkylnitrile chain, describing an intramolecular activation reaction occurred at the C—H bond $\alpha$ to the nitrile group, originating metalacyclic nickel species (2011).

The most recent study on this type of activation is the only example with results analogous to the ones of the present invention: G. Du and co-workers (2013) described the Synthesis and characterisation of several C,N,N'-tridentate nickel complexes bearing $\beta$-diketiminato ligands, obtained as the result of a cyclometallation reaction of one methyl substituent of the aniline group. However, a modification of the imine moiety also resulted in a C—H activation reaction at the ortho-phenyl position.

As mentioned before, the search for new polymeric materials with innovative characteristics has been subject of research. Within the different typologies, the synthesis of dendritic polymers that present a three-dimensional spherical architecture has shown to be of interest, since their highly branched structure confers unique properties such as low viscosity, good solubility and a high surface to introduce reactive centres/functionalities. The category of dendritic polymers includes the uniformly branched dendrimers and the hyperbranched polymers, with irregular branches, but with the advantage that they mimic the first ones and are easily synthesised. Uniform branches are usually introduced by the use of non-commercial monomers, which require specific multi-step synthetic methods, limiting the scale and the type of applications of the obtained products, being important to develop alternative single-step catalytic processes that use simple and commercially available monomers, such as ethylene.

A. Sen and co-workers (1998-2000) synthesised low molecular weight hyperbranched polyethylenes (PEs) using Ni and Pd catalysts, as well as Ta and Ti catalytic systems. However, the greatest advances in this field occurred when Z. Guan and co-workers (1999) showed that the microstructure of polyethylene (PE) could be easily controlled in the presence of Pd(II) $\alpha$-diimine catalysts, developed by M. Brookhart and co-workers, just by changing the pressure conditions in the admission of ethylene. This is due to the intrinsic mechanism of isomerisation along the polymeric chain ("chain walking"), which is an important feature of these type of catalysts and their Ni(II) analogues. During chain propagation, the active centre isomerises along the polymeric chain to an internal position through a sequential process of β-hydride elimination, bond rotation and subsequent 1,2-shift hydride migration. Thus, the next monomeric unit can be incorporated in any position of the polymeric chain rather than just at the end. With this strategy, the hyperbranched structure is created from the catalyst rather than through the monomer. By changing the experimental conditions it is possible to control the competition between the "chain walking" and the chain propagation processes and, consequently, adjust the polymeric chain topology from linear (high pressure e.g. 27 atm) to hyperbranched. (typically low pressure, ca. 1 atm). The diimine-Pd-type catalysts have been extensively studied on this topic and usually show a higher capability to perform "chain walking" in comparison with the analogous nickel catalysts. Nevertheless, recently reported results showed that Ni catalysts yield polyethylenes with branching degrees in the range of 120-150/1000 carbon atoms.

Taking into account the previous results, it is thus of interest, to develop new potentially tridentate iminopyrrolyl nickel complexes of type C,N,N', which have higher catalytic activities and simultaneously giving rise to hyperbranched polyethylene products.

SUMMARY OF THE INVENTION

The current invention relates to the synthesis of C,N,N'-tridentate iminopyrrolyl nickel complexes, with the general molecular structure (I), which can be used as catalysts for the polymerisation reaction of ethylene to hyperbranched polyethylene.

The singularity of these new complexes lies in the fact that the chelating iminopyrrolyl ligand, is a potentially bidentate ligand but, at the end of the synthetic reaction, it is bonded to the nickel centre as a tridentate ligand. In fact, the synthesis of the N,N'-bidentate nickel complexes follows a method described in the literature that has already been patented (D. A. Bansleben, S. K. Friedrich, T. R. Younkin, R. H. Grubbs, C. Wang, Patent WO98/42665, 1998). However, a structural particularity of the ligand precursors of this invention leads, at the end of the synthetic reaction, to the formation of C,N,N'-tridentate nickel complexes, thorough a C—H intramolecular activation reaction, yielding nickel metallacyclic compounds with a Ni-carbon bond. Some examples of this type of nickel complexes are included in this invention.

The current invention also includes the use of these new nickel complexes as catalysts for the polymerisation reaction of ethylene, to give rise to hyperbranched polyethylenes with potential use as lubricants and/or additives for polymers extrusion.

DETAILED DESCRIPTION OF THE INVENTION

The present invention relates to the synthesis of C,N,N'-tridentate iminopyrrolyl nickel complexes, characterised by the general molecular formula (I):

in which the chelating iminopyrrolyl ligand is bonded to the nickel centre in a tridentate fashion, through a subsequent cyclometallation reaction by an intramolecular C—H activation, in which:

Ar represents an aryl group, such as phenyl, biphenyl, naphtyl and equivalents, or a substituted aryl group, specially phenyl, having one or both ortho positions of the aromatic ring substituted with alkyl groups C1-C4, unsubstituted or substituted alkoxy or aryl groups, the latter preferably having alkyl C1 or trifluoromethyl groups in meta positions;

R1 represents a hydrogen atom or an alkyl group C1-C4;

R2 represents a hydrogen atom or an alkyl group C1-C4 or a substituted or unsubstituted aryl group preferably phenyl;

R3 represents always a methylene group;

R4 and R5 represent hydrogen atoms;

R6 represents a hydrogen atom, an alkyl group C1-C11, an unsubstituted or substituted aryl group or a halogen atom, but preferably a hydrogen atom;

L represents a neutral coordinating ligand, such as triphenylphosphine, tri(C1-C6 alkyl)phosphine, tricycloalkylphosphine, diphenylalkylphosphine, dialkylphenylphosphine, trialkylamine, arylamine such as pyridine, a nitrile such as acetonitrile or equivalent.

Additionally, the present invention also relates to the synthesis of the iminopyrrolyl tridentate nickel complexes, characterised by the general molecular formula (I), in which the iminopyrrolyl chelating ligand is bonded to the nickel centre in a tridentate fashion, through a subsequent cyclometallation reaction by a C—H intramolecular activation, in which:

Ar represents an aryl group, such as phenyl, biphenyl, naphtyl and equivalents, or a substituted aryl group, especially phenyl, having one or both ortho positions of the aromatic ring substituted with substituted or unsubstituted alkoxy or aryl groups, the latter preferably having C1 alkyl or trifluoromethyl groups, in meta positions;

R1 and R2 represent together a fused aromatic ring in the corresponding C=C bond, preferably a phenyl, substituted at least in one of the ortho positions by a methylene group (R3), which may be or not substituted in the other positions, by different or equal substituents, that can be C1-C4 (preferably methyl, isopropyl or t-butyl) or trifluoromethyl, methoxy or halogen;

R3 always represents a methylene group;

R4 and R5 represent hydrogen atoms;

R6 represents a hydrogen atom, an alkyl group C1-C11, a substituted or unsubstituted aryl group or a halogen, but preferably a hydrogen atom;

L represents a neutral coordinating ligand, such as triphenylphosphine, tri(C1-C6 alkyl)phosphine, tricycloalkylphosphine, diphenylalkylphosphine, dialkylphenylphosphine, trialkylamine, arylamine such as pyridine, a nitrile such as acetonitrile or equivalent.

The C,N,N'-tridentate iminopyrrolyl nickel complexes, object of this invention, can be used as aluminium-free catalysts for the polymerisation reaction of ethylene to hyperbranched polyethylene.

This invention also includes the use of these new nickel complexes as catalysts for the polymerisation of ethylene to give rise to hyperbranched polyolefins or polyethylenes with potential use in lubricants and/or additives for polymers extrusion.

Figure 1:
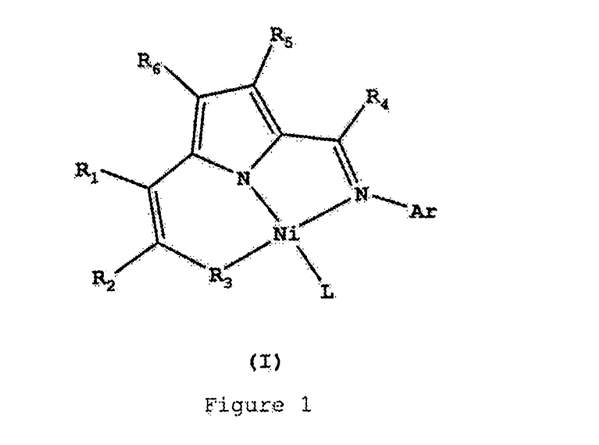
FIG. 1 shows the general molecular structure (I) of the nickel complexes of this invention.

In this invention, tridentate nickel complexes with chelating ligands of the type 5-R-2-(N-aryl)formiminopyrrolyl were synthesised, in which R can be an aryl or a vinyl group, having at least one methyl substituent, with a general molecular structure (I), shown in FIG. 1.

The synthesis of the ligand precursors is performed in three steps and the starting materials are usually of low cost and easily available from commercial sources.

In a first step, the 2-R-pyrrole (R=vinyl or aryl) is synthesised, subsequently the 5-R-2-formyl-1H-pyrrole is obtained through the reaction of dimethylformamide with phosphorus oxychloride and, in a third step, a condensation reaction is carried out with a primary aromatic amine (ArNH$_2$, Ar being preferably an aryl group substituted with bulky groups at positions 2 and 6) in acidic catalytic conditions, incorporating a bulky iminic group in the ligand structure and thus obtaining the 5-R-2-(N-aryl)formimino-1H-pyrrole ligand precursors.

In the first synthetic step, depending on whether the R substituent is vinyl (II) or aryl (III) (FIG. 2), the synthetic procedure is different.

For 5-R aryl substituents, the synthetic method used is a cross-coupling reaction. The arylation occurs through the reaction between the pyrrolylzinc chloride (generated in situ from the pyrrole sodium salt and zinc chloride) and the desired aryl bromide. Despite the use of palladium catalysts, which can increase the cost of the synthesis, the other starting materials are inexpensive and commercially available, and this method allows the preparation of the 2-arylpyrroles in good yields.

For 5-R vinyl substituents, the synthesis of the corresponding 2-vinylpyrroles is accomplished through a Wittig reaction. The 2-vinylpyrroles are thus obtained from the reaction between the 2-formylpyrrole and a substituted triphenylphosphonium ylide (Wittig reagent). The corresponding ylide is obtained in situ from the reaction of the phosphonium salt with a strong base. On the other hand, the phosphonium salt is synthesised by reacting the triphenylphosphine with the desired bromide (giving rise to the different substituents in the 2-vinylpyrrole).

In this particular case, the 2-bromopropane and the (1-bromoethyl)benzene were used to generate the desired 2-vinylpyrroles.

Any of the 5-R-2-(N-aryl)formimino-1H-pyrrole ligand precursors (II) or (III) are treated with excess of NaH, giving rise to the corresponding sodium salts Na[5-R-2-(N-aryl) formiminopyrrolyl] (II$_{Na}$) or (III$_{Na}$), which are subsequently coordinated to the nickel metal centre through the reaction with a complex of the type trans-[Ni(Cl)(Ar*)(PPh$_3$)$_2$], where Ar*=phenyl or 2-chlorophenyl. After coordination, a subsequent cyclometallation reaction occurs, through an intramolecular C—H activation, giving rise to a C,N,N'-tridentate complex, with concomitant elimination of benzene or chlorobenzene, respectively, and sodium chloride, as represented in the general equation (1):

$$\text{trans-[Ni(Cl)(Ar*)(PPh}_3\text{)}_2\text{]+(II}_{Na}\text{) or (III}_{Na}\text{)→(I)+Ar*H+NaCl} \qquad (1)$$

Figure 2:
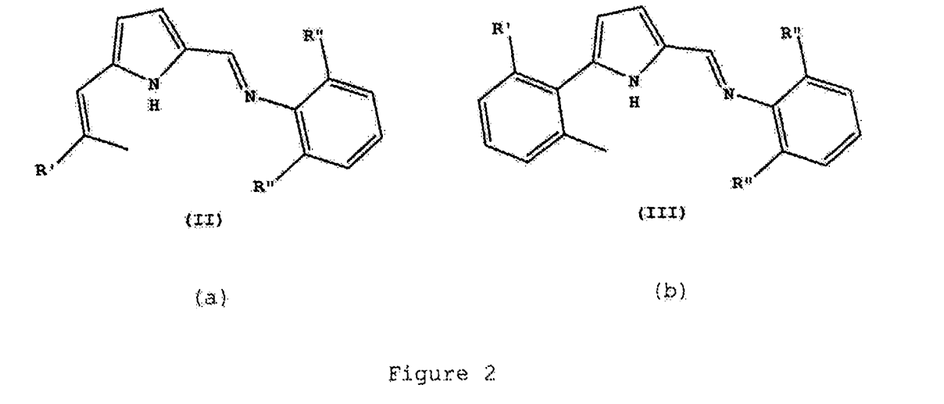
FIG. 2 shows the molecular structure of the ligand precursors II (a) and III (b) used for the synthesis of the complexes I.1 and I.2, and I.3, respectively.

Therefore, the synthesis of the ligand precursors II, with vinylic substituent groups at position 5 of the pyrrole ring (FIG. 2a), was projected in such a way to contain groups susceptible to suffer C—H activation. The double bond confers some rigidity to the molecule, favouring an approximation between the methyl group and the metallic centre, and simultaneously thermodynamically stabilises the final, cyclometallated product by extending the π-delocalisation of the electrons of the pyrrolyl ring to its 5-alkenyl arm, resulting in the formation of an approximately planar six-membered metallacycle.

Figure 3:
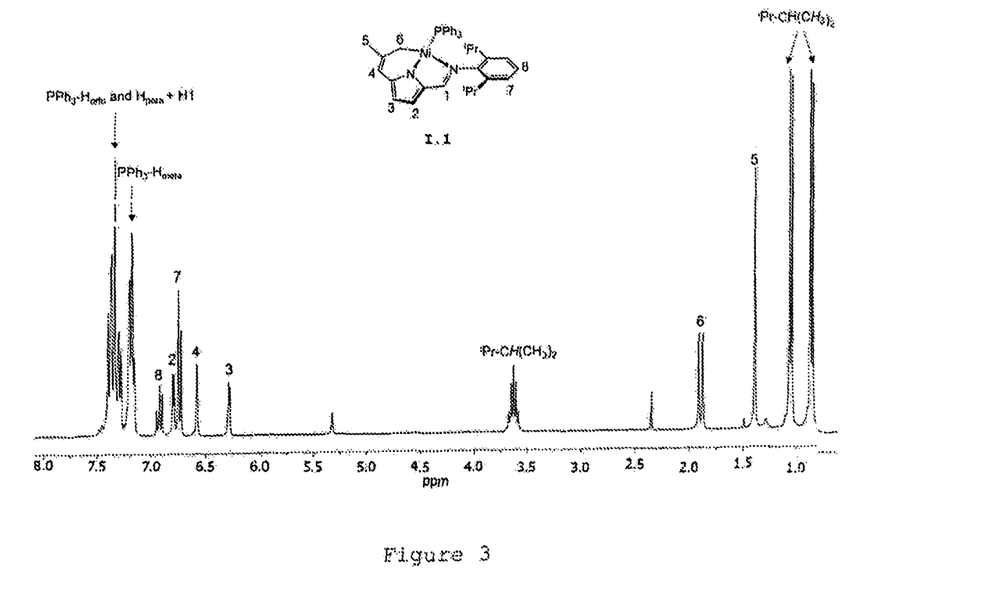
FIG. 3 shows the $^1$H NMR spectrum of complex I.1 in $CD_2Cl_2$, with the assignment of the different resonances and the corresponding integration values.
Figure 4:
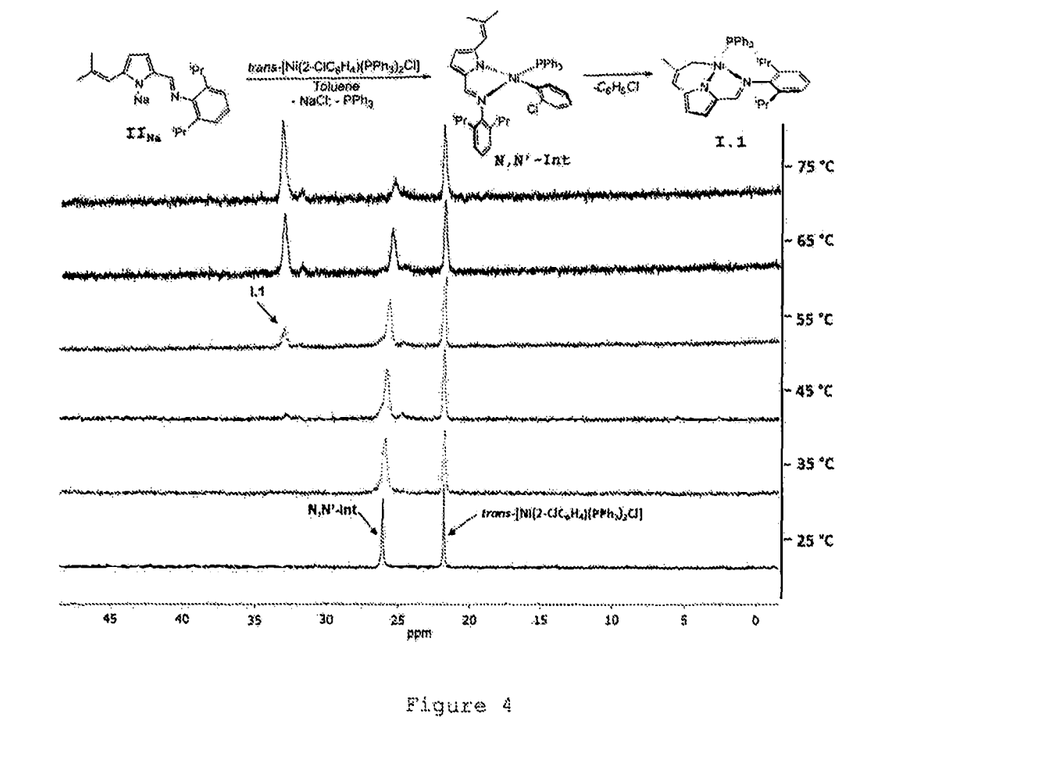
FIG. 4 shows the evolution of the reaction of the formation of the complex I.1 with the increase of the temperature, monitored by $^{31}P\{^1H\}$ NMR spectroscopy (reaction of the corresponding sodium salt II$_{Na}$ (R'=Me) with the trans-[NiCl(2-ClC$_6$H$_4$)(PPh$_3$)$_2$] complex).
Figure 6:
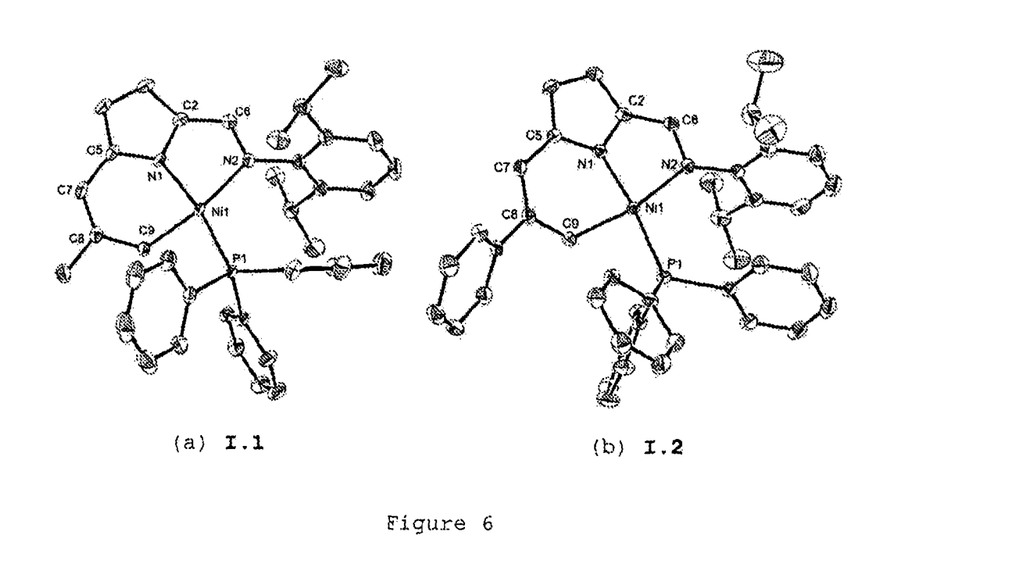
FIG. 6 shows the molecular structures of complexes I.1 (a) and I.2 (b), obtained by X-ray diffraction.

In Example 1, upon in situ deprotonation of the ligand precursor II (with R'=Me; R"=$^i$Pr) with NaH, in tetrahydrofuran (THF), the resulting solution was added to the complex trans-[NiCl(2-ClC$_6$H$_4$)(PPh$_3$)$_2$]. After evaporation of the solvent, the mixture was extracted with toluene, from which, after recrystallisation, a microcrystalline red solid corresponding to complex I.1, in 60% yield, was obtained. The compound was characterised by $^1$H (FIG. 3), $^{13}$C{$^1$H} and $^{31}$P{$^1$H} NMR, and its molecular structure was determined by X-ray diffraction (FIG. 6a). While monitoring the reaction evolution of Example 1 by $^1$H and $^{31}$P{$^1$H} NMR spectroscopy (FIG. 4), it is observed that the N,N'-bidentate iminopyrrolyl nickel complex is firstly formed, being subsequently converted into the C, N,N'-tridentate iminopyrrolyl nickel complex via an intramolecular C—H activation reaction, with concomitant elimination of benzene or 2-chlorobenzene.

Figure 5:
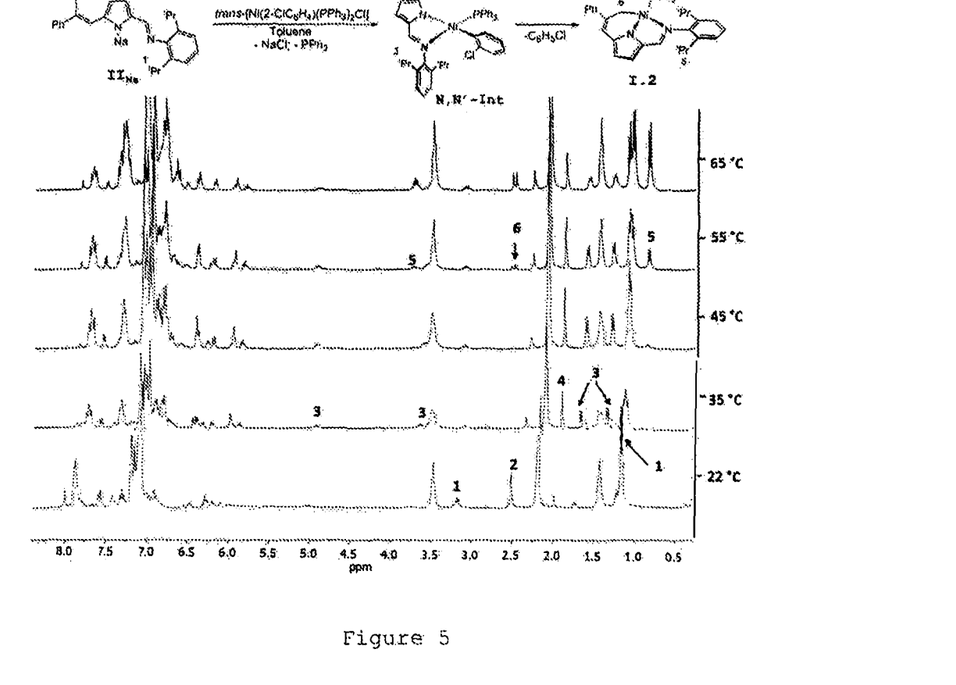
FIG. 5 shows the evolution of the $^1$H VT-NMR spectra for the reaction of the sodium salt II$_{Na}$ (R'=Ph) with complex trans-[NiCl(2-ClC$_6$H$_4$)(PPh$_3$)$_2$].

In Example 2, a similar reaction was performed but using the ligand precursor II (with R'=Ph; R"=$^i$Pr), leading to compound I.2 analogous to the previous one, as characterised by $^1$H (FIG. 5), $^{13}$C{$^1$H} and $^{31}$P{$^1$H} NMR and by its molecular structure determined by X-ray diffraction (FIG. 6b), in 55% yield. A similar study of $^1$H (FIG. 5) and $^{31}$P{$^1$H} NMR proves that the reaction pattern is analogous to the previous case, the bidentate complex being first formed and then evolving to the C,N,N'-tridentate species.

The newly formed Ni—C bond in the present C,N,N'-tridentate Ni(II) complexes, with concomitant elimination of chlorobenzene, occupies now the coordination position usually occupied by the triphenylphosphine ligand, being trans to the pyrrolyl ring nitrogen. The complexes show a square-planar geometry with a tetrahedral distortion, mostly caused by the methylene group bonded to the metal.

Figure 7:
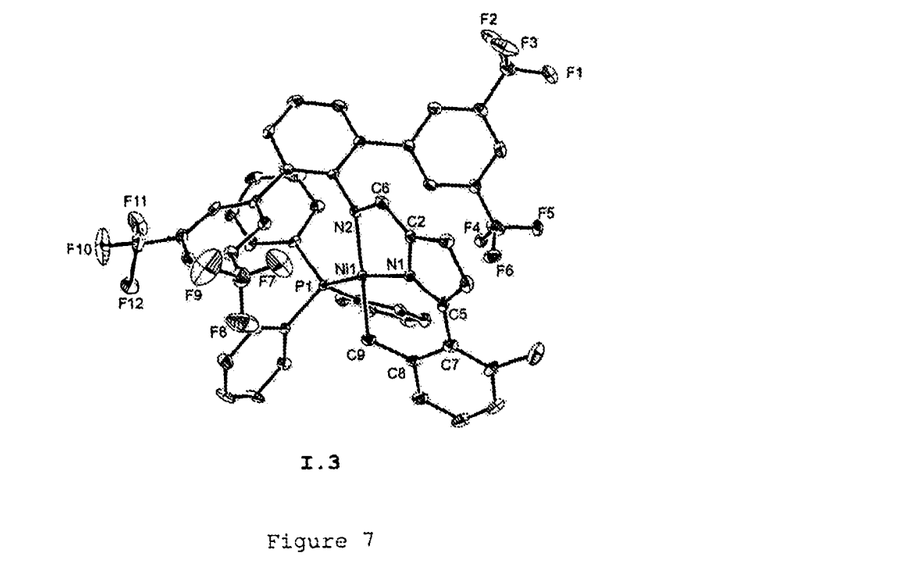
FIG. 7 shows the molecular structure of complex I.3, obtained by X-ray diffraction.

In the present invention, and based on the previously obtained results (C. A. Figueira, 20.13), the structure of the iminic position of the ligand precursors 5-(2,6-Me$_2$C$_6$H$_3$)-2-(N-arylformimino)-1H-pyrrole III (R'=Me; R"=3,5-(CF$_3$)$_2$C$_6$H$_3$) (FIG. 2b) was also modified by the introduction of an extremely bulky amine, the 2,6-bis[3,5-bis(trifluoromethyl) phenyl]aniline. In addition to the high steric volume imposed, by this amine on the ligand and subsequently in the complex, this group also has CF$_3$ substituents. The ligand precursor 5-(2,6-Me$_2$C$_6$H$_3$)-2-(N-(2,6-bis[3, 5-(CF$_3$)$_2$C$_6$H$_3$] C$_6$H$_3$)formimino)-1H-pyrrole was thus synthesised and the corresponding sodium salt, obtained in situ by the reaction with NaH, reacted with complex trans-[NiCl(Ph)(PPh$_3$)$_2$], as described in Example 3. The corresponding C,N,N'-tridentate complex I.3 was obtained in 61% yield after purification. This compound was characterised by $^1$H, $^{13}$C{$^1$H}, $^{31}$P{$^1$H} and $^{19}$F{$^1$H} NMR spectroscopy, and its molecular structure determined by X-ray diffraction (FIG. 7), being identical to the previous one concerning the coordination environment around the metal centre.

This invention also establishes that, through the combination of the results previously obtained (C. A. Figueira, 2013) and the current ones, it is possible to draw conclusions about some of the necessary requirements for the formation of this type of C,N,N'-tridentate nickel complexes. On the one hand, the presence of ligands with high steric hindrance can lead to C—H bond activation, as, it is observed in the case of ligands 5-(2,6-dimethylphenyl)-2-(N-arylformimino)pyrrolyl, where the 5-aryl substituent is cis to the triphenylphosphine ligand, favouring the C—H activation reaction. In fact, in order for the cyclometallation reaction to occur, the C—H bond must be easily accessible and directed to the metal centre, the presence of bulky substituents playing thus a significant role in meeting these requirements. However, the results presented in this invention prove that the geometries of the intermediates is a determining factor for the cyclometallation reaction, since, the reaction goes through the initial formation of a N,N'-bidentate complex, in which the position of the substituents relative to the metal centre, as well the presence of unsaturated bonds conjugated with the pyrrolyl ring, are important factors for the formation of the tridentate complexes.

Although the C—H bond activation occurs at room temperature, the use of higher reaction temperatures also favours the reaction, leading to the complete conversion of the bidentate complexes into the corresponding tridentate ones.

It is noteworthy that the use of the nickel starting complexes trans-[NiCl(Ph)(PPh$_3$)$_2$] or trans-[NiCl(2-ClC$_6$H$_4$)(PPh$_3$)$_2$] does not influence the activation, leading to similar patterns of reactivity and results, since the chlorobenzene elimination could be seen as more likely favoured than the elimination of benzene, due to the higher electronegativity of the Cl substituent.

The complexes I.1, I.2 and I.3, presented in Examples 1, 2 and 3 respectively, were used as catalysts for the polymerisation reaction of ethylene to hyperbranched polyethylene. Typically, the experiments were performed using $10^{-2}$ mmol of catalyst, at different conditions of pressure and temperature, and in the presence of co-catalyst [Ni(COD)$_2$] (phosphine scavenger). The products obtained were characterised by GPC/SEC and by $^1$H and $^{13}$C{$^1$H} NMR spectroscopy.

In another embodiment of the present invention, the polymerisation reaction of ethylene to hyperbranched polyethylene is performed in the absence of the co-catalyst.

The solvent used in the catalytic polymerisation tests of ethylene to obtain hyperbranched polyethylene is selected from one of the following: toluene, xylene, chlorobenzene, o-dichlorobenzene, pentane, hexane, heptane.

In a preferred embodiment of the present invention, the solvent used is toluene.

The results obtained in the catalytic polymerisation tests of ethylene to obtain hyperbranched polyethylene are listed in Table 1. It is possible to observe that the best values of catalytic activities are obtained in the presence of the co-catalyst [Ni(COD)$_2$], at 9 bar of ethylene pressure and 50° C., although the polyethylenes with the highest molecular weight are those obtained at 25° C. The catalytic tests performed at 15 bar showed a general decrease in the activity of the catalysts, but without significant variations in the characteristics of the products obtained.

TABLE 1

Catalytic tests[a] for the polymerisation of ethylene to hyperbranched PE and characteristics of the obtained PEs.

| Cat.[b] | P$_{abs}$ (bar) | T (° C.) | t (h) | PE (g) | Activ.[c] | M$_n$[d] (g/mol) | M$_w$/M$_n$ (Đ) | N[e] |
|---|---|---|---|---|---|---|---|---|
| I.1 | 3 | 25 | 2.0 | 0.012 | 0.20 | — | — | — |
| I.1 | 3 | 50 | 2.0 | 0.041 | 0.69 | — | — | — |
| I.1* | 3 | 25 | 2.0 | 1.05 | 17.57 | 860 | 1.3 | 160 |
| I.1* | 3 | 50 | 2.0 | 1.45 | 24.20 | 760 | 1.2 | 170 |
| I.1 | 9 | 25 | 2.0 | 0.04 | 0.20 | 570 | 1.1 | — |
| I.1 | 9 | 50 | 2.0 | 0.73 | 4.08 | 520 | 1.1 | 170 |
| I.1 | 9 | 25 | 2.0 | 3.81 | 21.16 | 890 | 1.3 | 160 |
| I.1* | 9 | 25 | 3.5 | 3.96 | 12.57 | — | — | — |
| I.1* | 9 | 50 | 2.0 | 4.51 | 25.07 | 760 | 1.3 | 160 |
| I.1* | 15 | 25 | 2.0 | 0.37 | 1.22 | 840 | 1.5 | 160 |
| I.2 | 9 | 25 | 2.0 | 0.02 | 0.13 | 560 | 1.1 | — |
| I.2 | 9 | 50 | 2.0 | 0.14 | 0.70 | 490 | 1.1 | 170 |
| I.2* | 9 | 25 | 2.0 | 1.84 | 10.23 | 810 | 1.3 | 160 |
| I.2* | 9 | 25 | 3.3 | 1.81 | 6.09 | 842 | 1.2 | — |
| I.2* | 9 | 50 | 2.0 | 3.34 | 18.55 | 710 | 1.3 | 170 |
| I.2* | 15 | 25 | 2.0 | 1.26 | 4.21 | 850 | 1.3 | 154 |
| I.3 | 9 | 25 | 2.0 | 0.98 | 5.46 | 16700 | 1.5 | 96 |
| I.3 | 9 | 50 | 2.0 | 6.60 | 36.71 | 12300 | 1.3 | 95 |
| I.3* | 9 | 25 | 2.0 | 8.37 | 46.52 | 20200 | 1.2 | 96 |
| I.3* | 9 | 25 | 6.0 | 18.14 | 34.75 | 15600 | 1.5 | — |
| I.3* | 9 | 50 | 2.0 | 12.84 | 71.37 | 10500 | 1.3 | 96 |
| I.3* | 15 | 25 | 2.0 | 11.18 | 37.28 | 17700 | 1.5 | 96 |

[a]Experimental conditions: [Ni] = $10^{-2}$ mmol; Solvent: toluene, 50 mL;
[b]Catalyst: complex I.X (X = 1 – 3) or I.X* complex I.X + 2 equiv. [Ni(COD)$_2$] (co-catalyst);
[c]Activity in kg PE/mol Ni · h · bar;
[d] Determined by GPC/SEC (PS standards);
[e] N = Branches/1000 C. atoms, determined by $^1$H NMR.

For Catalysts I.1 and I.2, the results are very similar, regarding the molecular weight and the branching degrees, however the first shows higher catalytic activities. These catalysts are structurally similar, differing only in the substituent methyl or phenyl of the 5-vinyl arm of the pyrrolyl ligand. Catalyst I.3 not only shows the highest catalytic activities, but also the polyethylenes obtained have higher molecular weights (M$_n$=10500-20200 g/mol). The terphenylimine substituent, extremely sterically hindered and with fluorine atoms, favours the polymer growth through the decrease of chain transfer reactions via β-hydride elimination. The branching degree is also substantially lower (9.6%).

Figure 8:
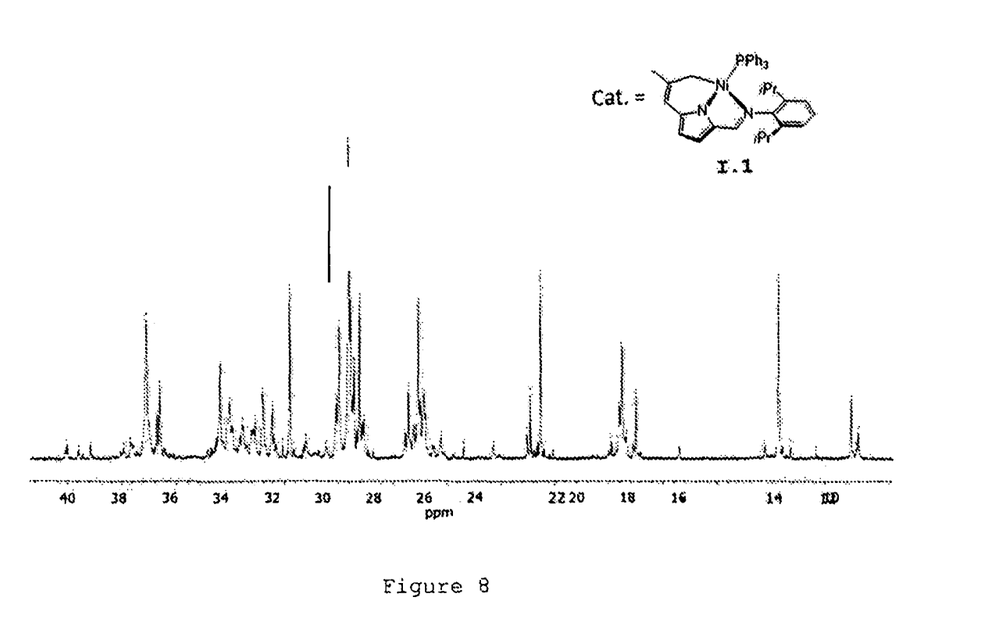
FIG. 8 shows the $^{13}C\{^1H\}$ NMR spectrum of the polyethylene obtained with the catalyst system I.1/[Ni(COD)$_2$], at 9 bar and 25° C.
Figure 9:
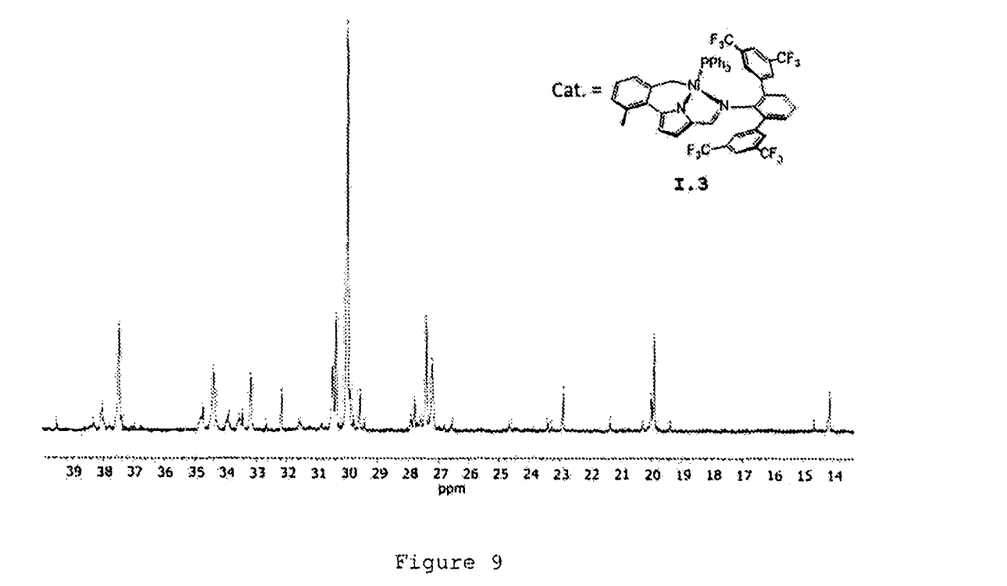
FIG. 9 shows the $^{13}C\{^1H\}$ NMR spectrum of the polyethylene obtained with the catalyst system I.3/[Ni(COD)$_2$], at 9 bar and 25° C.

The characterisation of the polymers by $^{13}$C{$^1$H} NMR gives information about the microstructure of the polyethylenes in terms of type and distribution of the branches along the main chain. Several studies have been carried out on the characterisation of polyethylenes, being possible to compare the distribution of the high and complex number of branches of these products. As can be seen in FIGS. 8 and 9, in general the products show short-chain branches ranging from methyl to butyl, long-chain branches (n≥6), a small fraction of branches-on-branches, and also unsaturations (internal and terminal) in the main chain. However, the highest percentage corresponds to methyl branches, which may be isolated or paired (1,4 and 1,6). Short-chain branches (ethyl, propyl, butyl) are presented in less quantity than the long ones. The polyethylenes obtained with the catalyst system I.3, show a significant decrease in the relative intensity of the peaks corresponding to long-chain branches and branches-on-branches, the corresponding microstructure being mainly composed by methyl branches, isolated or paired. The presence of unsaturated bonds is not evident in this case due to the high molecular weight of the polymer.

These catalyst systems have activities comparable with the equivalent systems described in the literature. The main difference, from the reported systems lies in the combination of the two main characteristics of the polyethylenes obtained with the compounds of the present invention: a low molecular weight and a high branching degree (10-17%), values even higher than the ones already reported for hyper-branched polyethylenes (ca. 15%) obtained with nickel catalysts.

This set of properties is important because low molecular weight hyperbranched polyethylenes can be used as blending additives in polymer extrusion processing, as lubricant shear-stable viscosity additives, as well as for the synthesis of monofunctional hyperbranched ethylene oligomers, which are potentially useful as lubricants or surface modifiers. Low molecular weight hyperbranched polyethylenes with low viscosities also have potential applications as bases for the formulation of synthetic high-performance lubricants.

EXAMPLES

General Procedure for the Synthesis of the C,N,N'-Tridentate Iminopyrrolyl Nickel Complexes Described in the Examples The ligand precursor was suspended in THF (10 mL) and added slowly with stirring to a Schlenk tube containing the previously weighed NaH powder. When the addition was complete, the mixture was refluxed for 2 h. After cooling to room temperature, the solution was filtered, the solvent removed and the powder was dried under vacuum and then dissolved in toluene (10 mL). Complex trans-[NiCl(Ar*)(PPh$_3$)$_2$] (Ar*=Ph or 2-ClC$_6$H$_4$ was suspended in toluene (30 mL) and the solution of the corresponding sodium salt added dropwise, at −20° C. The reaction mixture was heated gradually to 65° C. and stirred, for ca. 12 h under inert atmosphere, giving rise to a dark red solution. The solution was filtered and evaporated to dryness and the residue washed with n-pentane or n-hexane at low temperature (−10 to 0° C.). Subsequently, the compound was extracted with an appropriate solvent, the solution concentrated and stored at −20° C., yielding the pure complex.

Example 1

As described in the general procedure, 0.52 g (1.7 mmol) of the ligand precursor 5-(2-CH$_3$C$_3$H$_3$)-2-[N-(2,6-$^i$Pr$_2$C$_6$H$_3$)formimino]$^{-1}$H-pyrrole were deprotonated with 0.05 g (2.2 mmol) of NaH and the corresponding sodium salt was added to 1.09 g (1.5 mmol) of the complex trans-[NiCl(2-ClC$_6$H$_4$)(PPh$_3$)$_2$]. After washing with r-hexane and the resulting red solid was dissolved in a minimum of toluene and double-layered with n-hexane while stirring leading to the precipitation of a microcrystalline red solid. Yield: 0.5.6 g (60%). Crystals suitable for single crystal X-ray diffraction were obtained from a toluene solution at −20° C. This compound was characterised by NMR spectroscopy and elemental analysis.

$^1$H NMR (300 MHz, CD$_2$Cl$_2$): $\delta_H$ 7.40-7.28 (m, 10H, CHN, PPh$_3$-H$_{para}$ e. H$_{ortho}$), 7.21-7.15 (m, 6H, PPh$_3$-H$_{meta}$), 6.93 (t, 1H, $^3J_{HH}$=7.7 Hz, N-Ph-H$_{para}$), 6.80 (d, 1H, $^3J_{HH}$=3.6 Hz, H3), 6.74 (d, 2H, $^3J_{HH}$=7.7 Hz, N-Ph-H$_{meta}$), 6.58 (s, 1H, CH=C(CH$_3$)(CH$_2$)), 6.2.8 (d, 1H, $^3J_{HH}$=3.6 Hz, H4), 3.63 (hept, 2H, $^3J_{HH}$=6.8 Hz, CH(CH$_3$)$_2$), 1.89 (d, 2H, $^3J_{HP}$=11.5 Hz, CH=C(CH$_3$)(CH$_2$), 1.39 (s, 3H, CH=C(CH$_3$)(CH$_2$)), 1.05 (d, 6H, $^3J_{HH}$=6.8 Hz, CH(CH$_3$)$_2$), 0.86 (d, 6H, $^3J_{HH}$=6.8 Hz, CH(CH$_3$)$_2$. $^{13}$C NMR $\{^1H\}$ (75 MHz, CD$_2$Cl$_2$): $\delta_C$ 160.0 (d, $^3J_{CP}$=2.6 Hz, CHN), 149.4 (N-Ph-C$_{ipso}$), 147.7 (d, $^3J_{CP}$=2.3 Hz, CH=C(CH$_3$)(CH$_2$)), 146.5 (d, $^3J_{CP}$=1.6 Hz, C5) 141.8 (N-Ph-C$_{ortho}$), 140.7 (d, $^3J_{CP}$=1.4 Hz, C2), 134.5 (d, $^2J_{CP}$=11.3 Hz, PPh$_3$-C$_{ortho}$), 132.8 (d, $^1J_{CP}$=41.0 Hz, PPh$_3$-C$_{ipso}$), 129.0 (d, $^4J_{CP}$=2.1 Hz, PPh$_3$-C$_{para}$), 128.5 (d, $^3J_{CP}$=9.5 Hz, PPh$_3$-C$_{meta}$), 125.9 (N-Ph-C$_{para}$), 123.3 (N-Ph-C$_{meta}$), 118.5 (d, $^4J_{CP}$=1.5 Hz, C3), 117.6 (CH=C(CC(CH$_3$)(CH$_2$)), 109.5 (d, $^4J_{CP}$=3.6 Hz, C4), 28.4 (CH(CH$_3$)$_2$), 25.8 (CH(CH$_3$)$_2$), 25.3 (CH$_3$), 25.2 (d, $^2J_{CP}$=21.3 Hz, Ni—CH$_2$), 22.1 (CH(CH$_3$)$_2$). $^{31}P\{^1H\}$ NMR (121 MHz, CD$_2$Cl$_2$): $\delta_P$ 32.1. Anal. Calculated (%) for C$_{39}$H$_{41}$N$_2$NiP: C, 74.66; H, 6.59; N, 4.46. Found: C, 74.94; H, 6.69; N, 4.28.

Example 2

As described in the general procedure, 0.56 g (1.5 mmol) of the ligand precursor 5-(2-PhC$_3$H$_4$)-2-[N-(2,6-$^i$Pr$_2$C$_6$H$_3$)formimino]-1H-pyrrole were deprotonated with 0.05 g (2.0 mmol) of NaH and the corresponding sodium salt was added to 0.88 g (1.2 mmol) of the complex trans-[NiCl(2-ClC$_6$H$_4$)(PPh$_3$)$_2$]. After washing with n-hexane and the remaining red solid extracted with diethyl ether, the resulting solution was further concentrated and stored at −20° C., giving red crystals suitable for single crystal X-ray diffraction. Yield: 0.46 g (55%). This compound was characterised by NMR spectroscopy and elemental analysis.

$^1$H NMR (300 MHz, CD$_2$Cl$_2$): $\delta_H$ 7.41 (s, 1H, CHN), 7.35-7.29 (m, 6H, PPh$_3$-H$_{ortho}$), 7.24-7.19 (m, 3H, PPh$_3$-H$_{para}$), 7.10-7.05 (m, 7H, PPh$_3$-H$_{meta}$ e. CH=C(CH$_2$)(Ph)), 7.01-6.99 (m, 3H, Ph-H$_{ortho}$ and Ph-H$_{para}$), 6.94-6.86 (m, 4H, Ph-H$_{meta}$, N-Ph-H$_{para}$ e H3), 6.73 (d, 2H, $^3J_{HH}$=7.7 Hz, N-Ph-H$_{meta}$), 6.49 (d, 1H, $^3J_{HH}$=2.8 Hz, H4), 3.62 (hept, 2H, $^3J_{HH}$=7.0 Hz, CH(CH$_3$)$_2$), 2.28 (d, 2H, $^3J_{HP}$=11.2 Hz, CH═C(Ph)(CH)), 1.06 (d, 6H, $^3J_{HH}$=6.7 Hz, CH(CH$_3$)$_2$), 0.89 (d, 6H, $^3J_{HH}$=6.7 Hz, CH(CH$_3$)$_2$). $^{13}$C{$^1$H} NMR (75 MHz, CD$_2$Cl$_2$): $\delta_C$ 160.3 (d, $^3J_{CP}$=2.6 Hz, CHN), 149.2 (N-Ph-C$_{ipso}$), 148.2 (d, $^3J_{CP}$=2.1 Hz, CH═C(Ph)(CH$_2$)), 146.4 (d, $^3J_{CP}$=1.5 Hz, C5), 144.6 (Ph-C$_{ipso}$), 141.7 (N-Ph-C$_{ortho}$), 141.2 (d, $^3J_{CP}$=1.2 Hz, C2), 134.4 (d, $^2J_{CP}$=11.2 Hz, PPh$_3$-C$_{ortho}$), 132.3 (d, $^1J_{CP}$=41.1 Hz, PPh$_3$-C$_{ipso}$), 129.8 (d, $^4J_{CP}$=2.0 Hz, PPh$_3$-C$_{para}$), 128.4 (d, $^3J_{CP}$=9.5 Hz, PPh$_3$-C$_{meta}$), 127.9 (Ph-C$_{ortho}$), 126.9 (Ph-C$_{meta}$), 126.2, (Ph-C$_{para}$), 126.1 (N-Ph-C$_{para}$), 123.3 (N-Ph-C$_{meta}$), 118.9 (CH═C(Ph)(CH$_2$)), 118.6 (d, $^4J_{CP}$=1.4 Hz, C3), 111.6 (d, $^4J_{CP}$=3.5 Hz, C4), 28.5 (CH(CH$_3$)$_2$), 25.8 (CH(CH$_3$)$_2$), 22.3 (d, $^2J_{CP}$=20.0 Hz, Ni—CH$_2$), 22.0 (CH(CH$_3$)$_2$). $^{31}$P{$^1$H} NMR (121 MHz, CD$_2$Cl$_2$): $\delta_P$ 32.4. Anal. Calculated (%) for C$_{44}$H$_{43}$N$_2$NiP: C, 76.65; H, 6.29; N, 4.06. Found: C, 76.19; H, 6.01; N, 3.78.

Example 3

[Ni{κ$^3$C,N,N'-5-[2'-CH$_2$-6'-CH$_3$—C$_6$H$_3$]—NC$_4$H$_2$-2-C(H)═N-2,6-[3,5-(CF$_3$)$_2$C$_6$H$_3$]$_2$C$_6$H$_3$}(PPh$_3$)]

As described in the general procedure, 1.05 g (1.5 mmol) of the ligand precursor 5-[2',6'-(CH$_3$)$_2$C$_6$H$_3$]-2-{N-[2,6-[3,5-(CF$_3$)$_2$C$_6$H$_3$]$_2$C$_6$H$_3$]formimino}-1H-pyrrole were deprotonated with 0.05 g (2.0 mmol) of NaH and the corresponding sodium salt was added to 0.83 g (1.2 mmol) of the complex trans-[NiCl(Ph)(PPh$_3$)$_2$]. After washing with n-pentane, the remaining orange solid was dried under vacuum. Since the complex is partially soluble in n-pentane, the solution resulting from the washings was concentrated and stored at −20° C., giving crystals suitable for single crystal X-ray diffraction. Yield: 0.74 g (61%). This compound was characterised by NMR spectroscopy and elemental analysis.

$^1$H NMR (300 MHz, CD$_2$Cl$_2$): $\delta_H$ 8.06 (s, 4H, ortho-Ph-H$_{ortho}$), 7.89 (s, 2H, ortho-Ph-H$_{para}$), 7.32-7.04 (m, 19H, CHN, N-Ph-H$_{meta}$), N-Ph-H$_{para}$ e PPh$_3$), 6.99 (d, 1H, $^3J_{HH}$=7.3 Hz, 5-Ph-H$_{meta}^{CH}$$_3$), 6.87-6.83 (m, 2H, H3 e H4), 6.54 (t, 1H, $^3J_{HH}$=7.4 Hz, 5-Ph-H$_{para}$), 6.01 (d, 1H, $^3J_{HH}$=7.4 Hz, 5-Ph-H$_{meta}^{CH}$$_2$), 2.61 (s, 3H, CH$_3$), 2.13 (d, 2H, $^3J_{HP}$=11.1 Hz, CH$_2$). $^{13}$C{$^1$H} NMR (75 MHz, CD$_2$Cl$_2$): $\delta_C$ 162.4 (d, $^3J_{CP}$=2.6 Hz, CHN), 148.9 (N-Ph-C$_{ipso}$), 147.8 (C5), 145.0 (d, $^3J_{CP}$=1.6 Hz, 5-Ph-C$_{ortho}^{CH}$$_2$), 141.6 (C2), 141.3 (N-Ph-C$_{ortho}$), 135.9 (5-Ph-C$_{ortho}^{CH}$$_3$), 134.3 (d, $^2J_{CP}$=11.4 Hz, PPh$_3$-C$_{ortho}$), 133.6 (0.5-Ph-C$_{ipso}$), 133.5 (ortho-Ph-C$_{ipso}$), 131.9 (PPh$_3$-C$_{para}$), 131.7 (quart, 2J$_{CP}$=33.0 Hz, ortho-Ph-C$_{meta}$), 131.3 (d, $^3J_{CP}$=2.7 Hz, ortho-Ph-C$_{ortho}$), 130.2 (br, N-Ph-C$_{meta}$ and N-Ph-C$_{para}$), 128.6 (d, $^4J_{CP}$=10.4 Hz, PPh$_3$-C$_{meta}$), 127.7 (5-Ph-C$_{meta}^{CH}$$_3$), 126.7 (d, $^4J_{CP}$=7.7 Hz, 5-Ph-C$_{meta}^{CH}$$_2$). 125.2 (5-Ph-C$_{para}$), 123.9 (quart, $^1J_{CF}$=271.3 Hz, CF$_3$), 121.0 (sept, $^3J_{CF}$=3.6 Hz, ortho-Ph-C$_{para}$), 120.2 (C3), 115.3 (C4), 24.8 (d, $^2J_{CP}$=20.9 Hz, Ni—CH$_2$), 23.7 (CH$_3$). $^{31}$P{$^1$H} NMR (121 MHz, CD$_2$Cl$_2$): $\delta_P$ 33.1. $^{19}$F{$^1$H} NMR (282 MHz, CD$_2$Cl$_2$): $\delta_F$ −63.0. Anal. Calculated (%) for C$_{35}$H$_{35}$F$_{12}$N$_2$NiP: C, 62.56; H, 3.47; N, 2.75. Found: C, 62.78; H, 3.20; N, 2.67.

General Procedure for the Catalytic Polymerisation of Ethylene to Hyperbranched Polyethylene The catalytic polymerisation reactions of ethylene to obtain hyperbranched polyethylene were carried out in 300 mL Miniclave Drive Büchi pressure reactors with glass vessels (up to 9 bar) or stainless steel (up to 1.5 bar) vessels. The reactors were previously dried in an oven at 140° C. and degassed, and dry distilled toluene (50 mL) was added, under a pressure of 1.3 bar of nitrogen. The reactor was warmed to the desired temperature (from 25° C. to 50° C.) and allowed to equilibrate for 10 min. After a new degassing, the reactors were pressurised with ethylene and a solution of the catalyst in toluene (10$^{-2}$ mmol, 1 mL) was added, followed, when 0.25 appropriate, by the addition of a solution of [Ni(COD)$_2$] in toluene (2 mL). The ethylene pressure was raised up to the desired value (3 to 15 bar) and the admission valve was maintained continuously opened during the reaction time (2 to 6 hours). At the end of the catalytic test the ethylene supply was closed, the reactor was depressurised, and the reaction medium was quenched with methanol while stirring. The formation of an oily phase was observed in almost all the tests and which was isolated through the evaporation of the volatiles at reduced pressure. The isolated products were dried until constant weight, yielding colourless oils with different densities and viscosities.

All the products were characterised by GPC/SEC and $^1$H and $^{13}$C{$^1$H} NMR spectroscopy. The NMR samples were dissolved in 0.8 mL of a mixture of 1,2,4-trichlorobenzene and C$_6$D$_6$ (75:25 v/v), and the spectra recorded at 90° C. Through the analysis of the $^1$H Spectra it is possible to determine the branching degree of the polymers, N, which is the total number of branches per 1000 carbon atoms. The analysis of the $^{13}$C{$^1$H} spectra indicates the type and distribution of those branches.

Blank tests were performed to analyse the catalytic activity of the [Ni(COD)$_2$] scavenger at the different conditions of temperature and pressure, which was found to be inactive in all the conditions used.

The invention claimed is:
1. A tridentate iminopyrrolyl nickel complex represented by general molecular formula (I), in which a chelating iminopyrrolyl ligand is bonded to the nickel centre in a tridentate fashion, through a subsequent cyclometallation reaction by an intramolecular CH activation, wherein general molecular formula (I) has the structure:

a) Ar represents an aryl group or a substituted aryl group, having one or both ortho positions of an aromatic ring substituted with C1-C4 alkyl groups, unsubstituted or substituted alkoxy or aryl groups;
b) R1 represents a hydrogen atom or a C1-C4 alkyl group;
c) R2 represents a hydrogen atom or a C1-C4 alkyl group or a substituted or unsubstituted aryl group;
d) R3 represents a methylene group;
e) R4 and R5 represent hydrogen atoms;
f) R6 represents a hydrogen atom, a C1-C11 alkyl group, an unsubstituted or substituted aryl group or a halogen;
g) L represents a neutral coordinating ligand selected from the group consisting of triphenylphosphine, tri(C1-C6 alkyl)phosphine, tricycloalkylphosphine, diphenylalkylphosphine, dialkylphenylphosphine, trialkylamine, arylamine, and a nitrile or equivalents.

2. The tridentate iminopyrrolyl nickel complex of claim 1, wherein Ar represents a phenyl, biphenyl, naphthyl and equivalents, or a substituted aryl group.

3. The tridentate iminopyrrolyl nickel complex of claim 2, wherein the substituted aryl group represented by Ar is a substituted phenyl group.

4. The tridentate iminopyrrolyl nickel complex of claim 2, wherein a substituted aryl group substituted on one or more of the ortho positions of an aromatic ring of the substituted aryl group represented by Ar comprises C1 alkyl or trifluoromethyl groups in meta positions.

5. The tridentate iminopyrrolyl nickel complex of claim 1, wherein the substituted or unsubstituted aryl group represented by R2 is phenyl.

6. The tridentate iminopyrrolyl nickel complex of claim 1, wherein R6 is a hydrogen atom.

7. The tridentate iminopyrrolyl nickel complex of claim 1, wherein the arylamine is pyridine.

8. The tridentate iminopyrrolyl nickel complex of claim 1, wherein the nitrile is acetonitrile.

9. A process of polymerising ethylene to hyperbranched polyethylene from a solution of a tridentate iminopyrrolyl nickel complex defined in claim 1,
comprising mixing the tridentate iminopyrrolyl nickel complex in a solvent at a temperature between 25 and 50° C. to form the solution,
wherein the solution is continuously pressurized by ethylene monomer at a pressure between 3 and 15 bar, during a period between 2 and 6 hours,
wherein the tridentate iminopyrrolyl nickel complex acts as a catalyst to effect polymerisation of the ethylene monomer.

10. The process according to claim 9, further comprising addition of a co-catalyst, wherein the co-catalyst is [Ni(COD)$_2$].

11. The process according to claim 9, wherein the solvent used is selected from: xylene, toluene, chlorobenzene, o-dichlorobenzene, pentane, hexane, or heptane.

12. A tridentate iminopyrrolyl nickel complex represented by general molecular formula (I), in which the iminopyrrolyl chelating ligand is bonded to the nickel centre in a tridentate fashion, through a subsequent cyclometallation reaction by a C—H intramolecular activation, wherein general molecular formula (I) has the structure:

(I)

a) Ar represents an aryl group or a substituted aryl group, having one or both ortho positions of an aromatic ring substituted with substituted or unsubstituted alkoxy or aryl groups;

b) R1 and R2 represent together a fused aromatic ring containing the corresponding C=C bond, substituted at least in one of the ortho positions by a methylene group (R3), but which may be or not substituted in the other positions, by different or equal substituents, that can be C1-C4 alkyl, trifluoromethyl, methoxy or halogen;

c) R3 represents a methylene group;

d) R4 and R5 represent hydrogen atoms;

e) R6 represents a hydrogen atom, a C1-C11 alkyl group, a substituted or unsubstituted aryl group or a halogen;

f) L represents a neutral coordinating ligand selected from the group consisting of triphenylphosphine, tri(C1-C6 alkyl)phosphine, tricycloalkylphosphine, diphenylalkylphosphine, dialkylphenylphosphine, trialkylamine, arylamine, and a nitrile or equivalents.

13. The tridentate iminopyrrolyl nickel complex of claim 12, wherein Ar represents a phenyl, biphenyl, naphthyl and equivalents, or a substituted aryl group.

14. The tridentate iminopyrrolyl nickel complex of claim 13, wherein the substituted aryl group represented by Ar is a substituted phenyl group.

15. The tridentate iminopyrrolyl nickel complex of claim 13, wherein a substituted aryl group substituted on one or more of the ortho positions of an aromatic ring of the substituted aryl group represented by Ar comprises C1 alkyl or trifluoromethyl groups in meta positions.

16. The tridentate iminopyrrolyl nickel complex of claim 12, wherein the fused aromatic ring represented by R1 and R2 together is phenyl.

17. The tridentate iminopyrrolyl nickel complex of claim 12, wherein the arylamine is pyridine.

18. The tridentate iminopyrrolyl nickel complex of claim 12, wherein the nitrile is acetonitrile.

19. A process of polymerising ethylene to hyperbranched polyethylene from a solution of a tridentate iminopyrrolyl nickel complex defined in claim 12,
comprising mixing the tridentate iminopyrrolyl nickel complex in a solvent at a temperature between 25 and 50° C. to form the solution,
wherein the solution is continuously pressurized by ethylene monomer at a pressure between 3 and 15 bar, during a period between 2 and 6 hours,
wherein the tridentate iminopyrrolyl nickel complex acts as a catalyst to effect polymerisation of the ethylene monomer.

20. The process according to claim 19, further comprising addition of a co-catalyst, wherein the co-catalyst is [Ni(COD)$_2$].

* * * * *